July 15, 1969  J. C. DUDDY  3,455,740
STORAGE BATTERY HAVING INTERNAL ACID PACKAGE
Filed Feb. 2, 1967  2 Sheets-Sheet 1

July 15, 1969  J. C. DUDDY  3,455,740
STORAGE BATTERY HAVING INTERNAL ACID PACKAGE
Filed Feb. 2, 1967  2 Sheets-Sheet 2

United States Patent Office 3,455,740
Patented July 15, 1969

3,455,740
STORAGE BATTERY HAVING INTERNAL ACID PACKAGE
Joseph C. Duddy, Trevose, Pa., assignor, by mesne assignments, to E.S.B. Incorporated, Philadelphia, Pa., a corporation of Delaware
Filed Feb. 2, 1967, Ser. No. 613,469
Int. Cl. H01m 39/00
U.S. Cl. 136—26                        8 Claims

ABSTRACT OF THE DISCLOSURE

A storage battery having an internal acid package situated on top of the element. Channels necessary to conduct the acid around the cell element, together with means for puncturing the acid package so that the avid will flow from the package into the channels, are also disclosed.

Background of the invention

This application relates to lead-acid storage batteries, in which it is desirable to store inside the battery case a package of concentrated sulfuric acid to be released when needed.

In United States Patent No. 2,773,927 issued to Theodore Yeoman on Dec. 11, 1956, there is shown an acid container situated atop the charged plates. The bottom of the container is provided with a circular weakened section located approximately over the center of the plates. In the words of Yeoman, "To put a dry charged cell equipped with (the) acid container into operation it is only necessary to remove the vent filler cap and add suitable water to the cell container to a level somewhat above that of the bottom of (the) acid container after which ... the weakened section is punctured by use of a solid blunt shaft such as a punch." While on paper this sounds like a good idea, I have been unable to get Yeoman's battery to work for the reason that acid, when released as Yeoman suggests, burns or carbonizes the separators. I have tried various separator materials, including resin impregnated paper, microporous hard rubber, and diatamaceous earth-polyvinylchloride compositions, as well as holes having diameters as small as 1/16" to produce a slower flow of acid onto the separators, and in all cases I have been unable to prevent excessive separator charing. Based on my experience I believe it necessary to divert the concentrated acid around the separators in a manner to be described in detail below.

The other reference believed most relevant to this application is a final research report entitled "Immobilized Electrolyte Feasibility Study," prepared for the United States Army Tank Automotive Center under contract DA-11-022-AMC-2236(T), which report bears a date of Dec. 21, 1965. The pertinent portions of that report are as follows:

"Mechanical containment of liquid, concentrated sulfuric acid ... involves the storage of concentrated acid (liquid) above the plates of a battery. When it is desired to activate the battery, water is poured into the battery and, subsequently, the acid is released from the reservoir into the water ..."

"This type of approach has undoubtedly received the most attention in the past because it is so obvious. . . . Nevertheless, several problems are involved":

"The fluidity and corrosiveness of liquid acid obviously precludes its storage in direct contact with the plates or separators of a dry charge battery. As a result, the acid must be stored in a completely enclosed, acid resistant reservoir in the free space above ... the plates of the battery ..."

"Because of the violent evolution of heat that can occur when water is brought suddenly into contact with concentrated acid, the battery plates or separators could be deleteriously affected if the two liquids were not mixed carefully. Probably, the acid would have to be enclosed in a sealed reservoir and released from it only after most of the necessary quantity of water had been added to the battery. In order to establish if this could be done without undesirably affecting the battery components, the following simple experiment was perfomed."

"To a dry charge battery containing the proper amount of water, the appropriate quantity of concentrated acid was added over a period of two minutes. This resulted in a maximum temperature of 85° C. After allowing the battery to stand for one hour from the time the acid was added, the battery plates, separators, and electrolyte were examined for visible evidence of deterioration. No such deterioration was found, indicating that this would not be a problem."

One other portion of this report should be mentioned, this one stating that

"The chemical (concentrated acid) should not produce large quantities of heat when mixed with water. Evolution of large amounts of heat within short periods of time can result in high temperatures which might undesirably affect battery plates or separators. In this respect it is known that undesirable decomposition of some battery components occur if the temperature of the electrolyte exceeds temperatures of about 160° F."

In view of the fact that 85° C.=185° F., the conclusion drawn from the simple experiment outlined in the report is in contrast with the last sentence of this latter quotation. In light of what the report admits to be known about undesirable decomposition resulting from temperatures in excess of 160° F., and considering my own findings that the Yeoman construction produces separator burning, it is my opinion that the experiment outlined in the report was not valid, and neither is the conclusion drawn from it.

Summary of the invention

Even when the proper quantity of water is added before the acid is released, it has been found that to prevent damage to the separators it is necessary to divert the concentrated acid around the element so that the acid will be diluted with the water before it comes in contact with the separators. To achieve this result channels have been provided around the element together with means for puncturing the package of acid so that the acid will flow into these channels. When the acid flows into the water it generates heat which in turn sets up convection currents, which currents may be directed by the channels to obtain maximum mixing of the acid and water before the acid reaches the separators. Baffle sheets may also be placed across the top of the element to prevent separator burning in the event that somehow some concentrated acid should not flow directly into the channels.

Figures 1, 2:
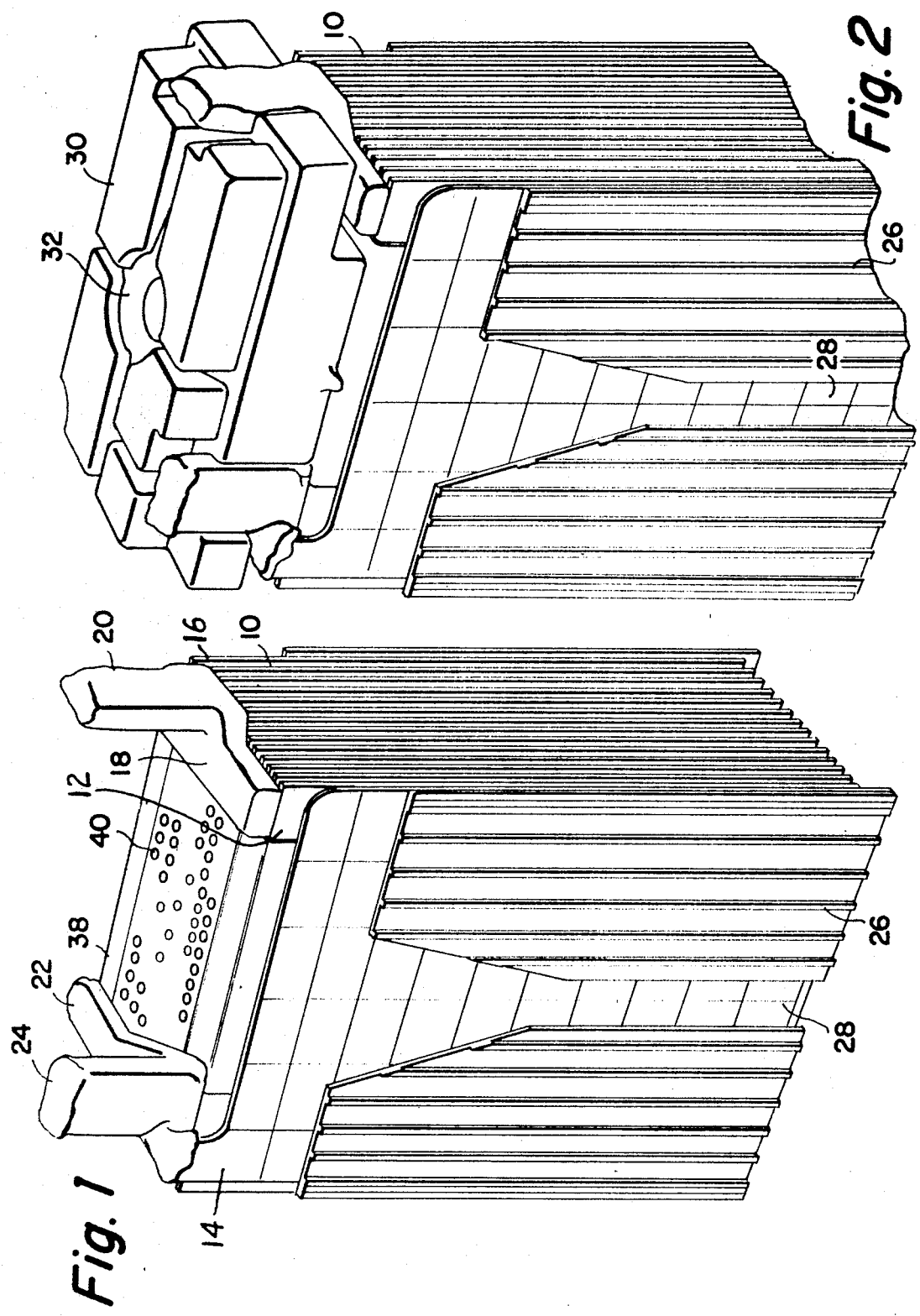
FIGURE 1 shows a battery element together with spacers having channels extending from the top of the element to the bottom of the element.
FIGURE 2 shows the battery element and spacers of FIGURE 1 but with a package of concentrated sulfuric acid positioned above the element.

The battery container itself is not shown in the drawings, since it is conventional. The container, if shown in the drawings, would only obstruct the view of the internal components of the battery.

Description of the preferred embodiment

The descritpion will assume a one cell battery, although of course the invention is equally adaptable to multicell batteries.

In FIGURE 1 there is shown a storage battery element 10 consisting of alternately stacked positive plates 12 and negative plates 14, separated from one another by separators 16. A connecting strap 18 and terminal post 20 are electrically connected to the positive plates, and likewise strap 22 and post 24 are electrically connected to the negative plates. The plates are dry charged.

At one end of the element is a spacer 26 having a channel 28 cut in it which extends from the top of the element to the bottom of the element. Preferably a second such spacer is situated at the other end of the element. The spacer fits between the element and the walls of the battery container.

FIGURE 2 shows a package 30 of concentrated sulfuric acid positioned above the element. The package is shaped to fit on or around the connecting straps 18 and 22 and the terminal posts 20 and 24, as well as to fit conveniently under the cover of the battery container. The package 30 also has an opening 32 extending through it to permit water to flow down into the container, as well as for other purposes.

Figure 3:
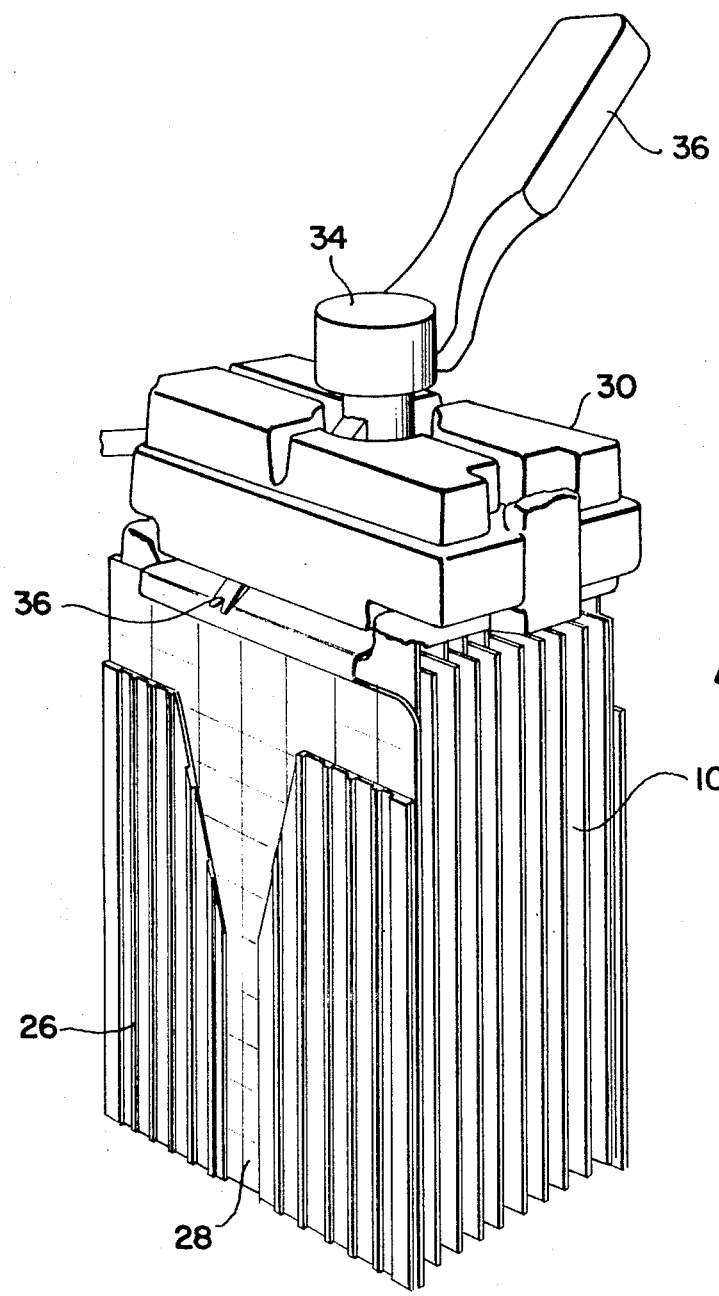
FIGURE 3 shows the means for puncturing the package of acid so that the acid will flow from the package into the channels of the spacers.

FIGURE 3 illustrates how the acid package 30 is to be punctured. In the assembled battery the vent plug would first be removed and then after water was added a guide 34 would be inserted in its place, the guide extending down into the opening 32 in the acid package. Through an appropriately positioned slot in the guide a knife 36 or other puncturing instrument is inserted, the slot directing the knife through the acid package at a proper angle so that the knife will come out of the bottom of the acid package directly above the channel in the spacer. In practice the acid package would preferably be punctured twice, once above the channel in each spacer. While it is not essential to do so, it might be advisable to construct the neck in the cover into which the vent plug normally fits so that the knife could only be inserted when it would be directed as shown in FIGURE 3 and at a corresponding angle in the direction of the other spacer; this would provide a built-in safety feature.

In the construction so far described, the volume of concentrated acid needed might require an acid package of such height that the height of the battery container might have to be increased slightly from that otherwise required. While this ordinarily would be no problem, certain batteries required by the government have fixed dimensions which preclude this easy change. In such cases an additional source of sulfate ions can be provided if the outside negative plate at each end of the element is soaked in sulfuric acid and dried but not formed. These plates would then supplement the acid package so that together the unformed negative plates and concentrated liquid acid would provide an electrolyte solution containing sufficient sulfate ions.

FIGURE 1 shows a baffle sheet 38 inserted between the outside plate and the separator adjacent to it, the baffle sheet being folded over toward the center of the element. The baffle sheet, which would be made from some material which is preferably porous but not penetrated or wet by concentrated sulfuric acid such as microporous polyvinylcholoride, would protect the separators from being burned by contact with concentrated acid. The baffle sheet could span the element and have its other end folded inside the inner surface of the other end plate, or two baffle plates—each extending inward toward the center of the element—could be used. Also shown in FIGURE 1 is a perforated sheet 40 made from nonporous polyvinylchloride or some other material which is positioned on top of the element; this sheet, which is in common use today, protects the plates and separators from damage by hydrometers or other objects which might be inserted into the assembled battery but does not interfer with mixing or diffusing processes.

The construction shown and described has several advantages over previously known constructions. In addition to protecting the separators from burns, when the concentrated acid is diverted out around the element as shown it will create convection currents which will aid in diffusing the acid in the water; these currents will carry the electrolyte first under the element and then upward into the center of the element. The heat released when the acid flows into the water will increase the internal temperature of the battery and thereby decrease the time required to activate the battery, with the rate of acid flow into the water being controlled by the size of hole produced by the knife in the acid package. The acid package, which would remain in the battery container even after the battery is activated, would reduce evaporation of electrolyte from the battery and thereby reduce maintenance problems; it also serves as a resilient member to hold down the element and thus counteracts the adverse action of shock and vibration. If the acid package were properly dimensioned, the battery container could be filled with water right up to the top of the acid package, thus providing a level indicator and making possible easy activating instructions; when later released, the concentrated sulfuric acid, being heavier than the water, would displace just a sufficient quantity of water to produce a final electrolyte of desired concentration. And of course one additional advantage of any battery having concentrated acid packaged internally is that it is a self-sufficient unit, needing only water to be activated; no separate containers of acid, with all of the hazards attendant with them, would be encountered.

I claim:

1. A dry charged, lead-acid storage battery comprising the following:
    (a) a battery container;
    (b) an element positioned within the battery container, the element being comprised of alternately spaced positive and negative dry charged plates separated from one another by separators;
    (c) a spacer between the element and the wall of the battery container, the spacer having a channel extending from the top of the element to the bottom of the element and so constructed and arranged as to prevent any concentrated acid from coming in contact with the separators until the acid has passed through the channel in the spacer;
    (d) a package of concentrated sulfuric acid positioned above the element; and,
    (e) means for puncturing the package of acid so that the acid will flow from the package into the channel of the spacer.

2. The battery of claim 1 having a baffle sheet which is porous but not penetrated by sulfuric acid and which is positioned between the outside plate and its adjacent separator, the top of the baffle sheet being folded over toward the center of the element.

3. The battery of claim 1 in which the puncturing means are operable only when so positioned that the hole to be punctured in the acid package will be directly above the channel in the spacer.

4. The battery of claim 2 in which the puncturing means are operable only when so positioned that the hole to be punctured in the acid package will be directly above the channel in the spacer.

5. A dry-charged, lead-acid storage battery comprising the following:
    (a) a battery container;
    (b) an element positioned within the battery container, the element being comprised of alternately spaced positive and negative plates separated from one another by separators, with unformed negative plates which have been acid soaked and dried being on both ends of the element and with the remaining negative plates on the interior of the element being dry-charged;

(c) a spacer between an unformed negative plate of the element and the wall of the battery container, the spacer having a channel extending from the top of the element to the bottom of the element and so constructed and arranged as to prevent any concentrated acid from coming in contact with the separators until the acid has passed through the channel in the spacer;

(d) a package of concentrated sulfuric acid positioned above the element; and (e) means for puncturing the package of acid so that the acid will flow from the package into the channel of the spacer.

6. The battery of claim 5 having a baffle sheet which is porous but not penetrated by sulfuric acid and which is positioned between an unformed negative plate and its adjacent separator, the top of the baffle sheet being folded over toward the center of the element.

7. The battery of claim 5 in which the puncturing means are operable only when so positioned that the hole to be punctured in the acid package will be directly above the channel in the spacer.

8. The battery of claim 6 in which the puncturing means are operable only when so positioned that the hole to be punctured in the acid package will be directly above the channel in the spacer.

References Cited

UNITED STATES PATENTS

| | | | |
|---|---|---|---|
| 2,773,927 | 12/1956 | Yeoman | 136—166 |
| 2,832,814 | 4/1958 | Shannon | 136—162 |
| 3,201,280 | 8/1965 | Yumoto | 136—26 |
| 3,304,202 | 2/1967 | Sam | 136—6 |

OTHER REFERENCES

"Immobilized Electrolyte Feasibility Study," G. L. Simmons, R. W. Adler, W. E. Elliott and W. L. Towle, prepared for U.S. Army Tank Automotive Center, Dec. 21, 1965, Contract DA–11–022–AMC–2236(T).

A. SKAPARS, Primary Examiner

U.S. Cl. X.R.

136—162, 166